(12) United States Patent
Lapidous

(10) Patent No.: US 7,278,114 B2
(45) Date of Patent: Oct. 2, 2007

(54) METHOD AND APPARATUS FOR MANAGING DISPLAY OF POPUP WINDOWS

(75) Inventor: Eugene Lapidous, Saratoga, CA (US)

(73) Assignee: ViewSpace Technologies, Saratoga, CA (US)

( * ) Notice: Subject to any disclaimer, the term of this patent is extended or adjusted under 35 U.S.C. 154(b) by 930 days.

(21) Appl. No.: 10/335,367

(22) Filed: Dec. 30, 2002

(65) Prior Publication Data

US 2004/0125149 A1 Jul. 1, 2004

(51) Int. Cl.
*G06F 3/00* (2006.01)
*G06F 9/00* (2006.01)
*G06F 17/00* (2006.01)

(52) U.S. Cl. ............... 715/808; 715/814; 715/817; 715/700; 715/764; 715/810; 715/815

(58) Field of Classification Search ........... 715/808, 715/814, 817, 700, 764, 810, 815
See application file for complete search history.

(56) References Cited

U.S. PATENT DOCUMENTS

| | | | |
|---|---|---|---|
| 5,557,724 A | 9/1996 | Sampat et al. | |
| 6,011,537 A | 1/2000 | Slotznick | |
| 6,061,061 A | 5/2000 | Conrad et al. | |
| 6,133,918 A | 10/2000 | Conrad et al. | |
| 6,177,936 B1 | 1/2001 | Cragun | |
| 6,337,696 B1 | 1/2002 | Lindhorst et al. | |
| 6,373,502 B1 | 4/2002 | Nielsen | |
| 6,459,440 B1 | 10/2002 | Monnes et al. | |
| 6,601,041 B1 * | 7/2003 | Brown et al. | 705/14 |
| 6,687,737 B2 * | 2/2004 | Landsman et al. | 709/203 |
| 6,968,507 B2 * | 11/2005 | Pennell et al. | 715/781 |
| 2002/0154163 A1 * | 10/2002 | Melchner | 345/749 |
| 2003/0051055 A1 | 3/2003 | Parrella, Sr. et al. | |
| 2004/0003400 A1 * | 1/2004 | Carney et al. | 725/42 |

OTHER PUBLICATIONS

Adsgone.com, "AdsGone Feature List," by A1Tech, Inc., 2002, 2 pages, Available: http://www.adsgone.com/features.asp.
CNN.com, "Pop-ups be gone," CNN.com/Sci-Tech, Jun. 28, 2002, 3 pages, Available: http://www.cnn.com/2002/TECH/internet/06/20/pop.ups/.
Gator Corporation, "Back Page Pop-ups," 2002, 3 pages, Available: http://www.gatorcorporation.com/advertise/popunders.html.
Gator Corporation, "Instant Messages Pop Ups," 2002, 2 pages, Available: http://www.gatorcorporation.com/advertise/popups.html.
hdsoft.com, "No more unsolicited pop-up windows while surfing the web," High Density Software, 2002, 4 pages, Available: http://www.hdsoft.com/?0.1.

(Continued)

*Primary Examiner*—Kristine Kincaid
*Assistant Examiner*—Peng Ke

(57) ABSTRACT

The present invention relates to various aspects of managing display of supplemental on-screen windows known as popup windows. In one embodiment, an exemplary method includes detecting a first window on a screen, determining whether the first window qualifies as a popup window, and if the first window qualifies as a popup window, searching for other windows on the screen that satisfy certain testing conditions and closing the first window without a user request upon failing to find any other window on the screen that satisfies the testing conditions.

21 Claims, 12 Drawing Sheets

OTHER PUBLICATIONS

McWilliams, B., "The pop-up ad campaign from hell," Salon.com Technology, May 7, 2002, 4 pages, Available: http://www.salon.com/tech/feature/2002/05/07/malware/.

Metcalf, B., "Advanced JavaScript windowing—part one: Self-closing popups," Developer.com, 2002, 8 pages, Available: http://softwaredev.earthweb.com/script/article/0,,12063_603511,00.html.

msdn.Microsoft.com, "NewWindow2 Event," 2002, 2 pages, Available: http://msdn.microsoft.com/library/default.asp?url=/workshop/browser/webbrowser/reference/events/newwindow2.asp.

msdn.Microsoft.com, "BeforeNavigate2 Event," 2002, 2 pages, Available: http://msdn.microsoft.com/library/default.asp?url=/workshop/browser/webbrowser/reference/events/beforenavigate2.asp.

Panicware.com, "Pop-Up Stopper® Pro," 2002, 2 pages, Available: http://www.panicware.com/product_pspro.html.

PCT Search Report Dated Dec. 10, 2004, 5 pages.

Fielding, R., et al. Hypertext Transfer Protocol—HTTP/1.1, Jan. 1997, 5 pages. Available: http://www.w3.org/Protocols/rfc2068/rfc2068.

* cited by examiner

METHOD AND APPARATUS FOR MANAGING DISPLAY OF POPUP WINDOWS

FIELD OF INVENTION

This invention relates generally to managing a life cycle of windows on a computer screen. It is particularly related to managing supplemental on-screen windows known as popup windows.

BACKGROUND OF THE INVENTION

Content retrieved over the Internet in response to a user request is usually presented in a primary window of the Internet browser, such as Internet Explorer® developed by Microsoft Corporation of Redmond, Wash. Some Internet content contains embedded instructions written in a script language, which cause opening of a new browser window without an additional user request.

Such a new browser window usually "pops up" in front of the primary window with the requested content, and is often referred to as a "popup" window. Usually, the size of a popup window is smaller than the size of a primary window and the number of interface elements displayed in a popup window is smaller than in a primary window to increase space available for content. For instance, some popup windows display only a window title, and not a menu bar, a toolbar and an address bar. Content displayed in a popup window is often optimized for a fixed size and is presented in a window having non-resizable borders.

A popup window may also be opened in response to a direct user input, such as a click on a link. In this case, the user input does not specify that a new window has to appear. Rather, a content provider causes a new window to open by embedding special instructions associated with a standard user action. A significant number of Web sites prefers to display new content in an additional window without an address bar, instead of replacing content in a primary window.

Popup windows may play a useful role, providing an additional means of delivering content outside of a primary window. Web sites may use popup windows to display advertisements or supplemental content such as navigation hints, subscription offers, input feedback, etc. However, many Internet users consider popup windows to be annoying distractions that decrease quality of their browsing experience. One of the main reasons for this is that popup windows make navigation more difficult: a user must manually close each popup window to avoid the accumulation of irrelevant windows on a desktop. As a result, a user has to spend at least twice as much effort to leave a site with a popup window than a site with no popup windows.

Different methods of an automatic control of popup windows have been developed to make the browsing process more convenient. For example, a script embedded in a main document may be used not only to open a popup window when a main document is loaded but also to close this popup window when the main document is unloaded or when the popup window is covered by another window. However, this approach does not keep a popup window visible while the user browses related documents stored on the same server. For instance, the main page of the news site may show a popup window with an offer to subscribe to premium content. If the user clicks on a content link, reviewing a sample of the premium content, the popup window will be automatically closed, and the user will have to return to the main page to see the subscription offer again. As a result, the site can loose the potential subscribers that do not return to the main page.

Closing a popup window when a main document is unloaded is especially inconvenient when combined with other popular methods of popup control, such as an opening of a popup window only if the same popup window has not already been opened during either the same browser session or within a pre-defined time. In the above example of the news site, the user may not see a subscription offer again if a corresponding popup window appears only once per session. As a result, the majority of web sites do not close their popup windows when unloading a main document, thus giving a user more time for accessing a popup window but making navigation more difficult.

Some Internet browsers, such as Netscape Navigator® developed by Netscape Corporation of Mountain View, Calif., support an automatic closing of a popup window when executing a user request to close a main window with a parent document. In this case, the popup window remains visible while the main window is open, even if the parent document is replaced with some new content. New content may, in turn, cause other popup windows to appear on the screen. If the user does not close each popup window manually, accumulated popup windows may clutter the desktop during navigation in the same main window.

U.S. Pat. No. 6,133,918 describes a solution in which a selection of a window on the desktop causes other windows to slide off the screen, instead of remaining in the background. Hidden windows may be recalled from their icons on the taskbar. However, if multiple popup windows appear during the same browsing session, their icons will clutter the taskbar even if the windows themselves are hidden, making the selection of useful items more difficult.

Some users are tolerant to the display of advertisements in popup windows, if such popup windows can be easily closed. Other users prefer popup advertisements not to be displayed at all, even if specified by the content provider. For instance, majority of the users do not want to see popup windows opened when main documents are unloaded (a technique used by some content providers that deliberately makes a content change more difficult).

To prevent unsolicited popup windows from appearing, users may install special applications known as popup blockers. For instance, a Pop-Up Stopper® Pro application, developed by Panicware Inc. of Seattle, Wash., enables a user to prevent all popup windows from opening. However, blocking all popup windows may significantly degrade the user experience on the sites that use popup windows to provide relevant content, references or input feedback. To mitigate this problem, Pop-Up Stopper® Pro and other similar applications allow users to specify a list of sites allowed to open popup windows, and reject popup windows initiated by a site that is not included in the list. A problem with such a "white list" implementation is that, unless a popup window is displayed, a user may not know whether it is useful enough to request its display in the future.

To give a user an option to see relevant popup windows, an alternative approach is provided, in which a user is presented with all popup windows except those that are contained in a "black list" or contain proscribed words in their content or title. In this case, the user is constantly required to teach an application which popup windows must be rejected. Stored black lists rapidly become obsolete with changes of domains and headers used by advertisers. In addition, rejecting a popup window based on its title or content may not provide a workable solution because a popup window has to be loaded on the user computer before its title or content becomes known. As a result, this approach decreases a useful bandwidth and may also present a security risk if popup content was retrieved as a result of redirection to an unknown server. In at least one known case, content retrieved after such redirection contained embedded instructions that placed unauthorized executable modules on users' computers, creating "back doors" to monitor user activities.

SUMMARY OF THE INVENTION

The present invention relates to various aspects of managing display of supplemental on-screen windows known as popup windows.

In one aspect of the present invention, an exemplary method includes detecting a first window on a screen, determining whether the first window qualifies as a popup window, and if the first window qualifies as a popup window, searching for other windows on the screen that satisfy certain testing conditions and closing the first window without a user request upon failing to find any other window on the screen that satisfies the testing conditions.

In another aspect of the present invention, an exemplary method includes detecting a first window on a screen, testing content in the first window for relevancy to content in other open windows on the screen, and closing the first window upon determining that the content in the first window is not relevant to the content in the other open windows.

In yet another aspect of the present invention, an exemplary method includes detecting a browser command to open a new window in addition to one or more existing windows on a screen, comparing a certain portion of a network address of content to be displayed in the new window with a corresponding portion of a network address of content displayed in the existing windows, and canceling the retrieval of the new window if these network address portions do not match.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
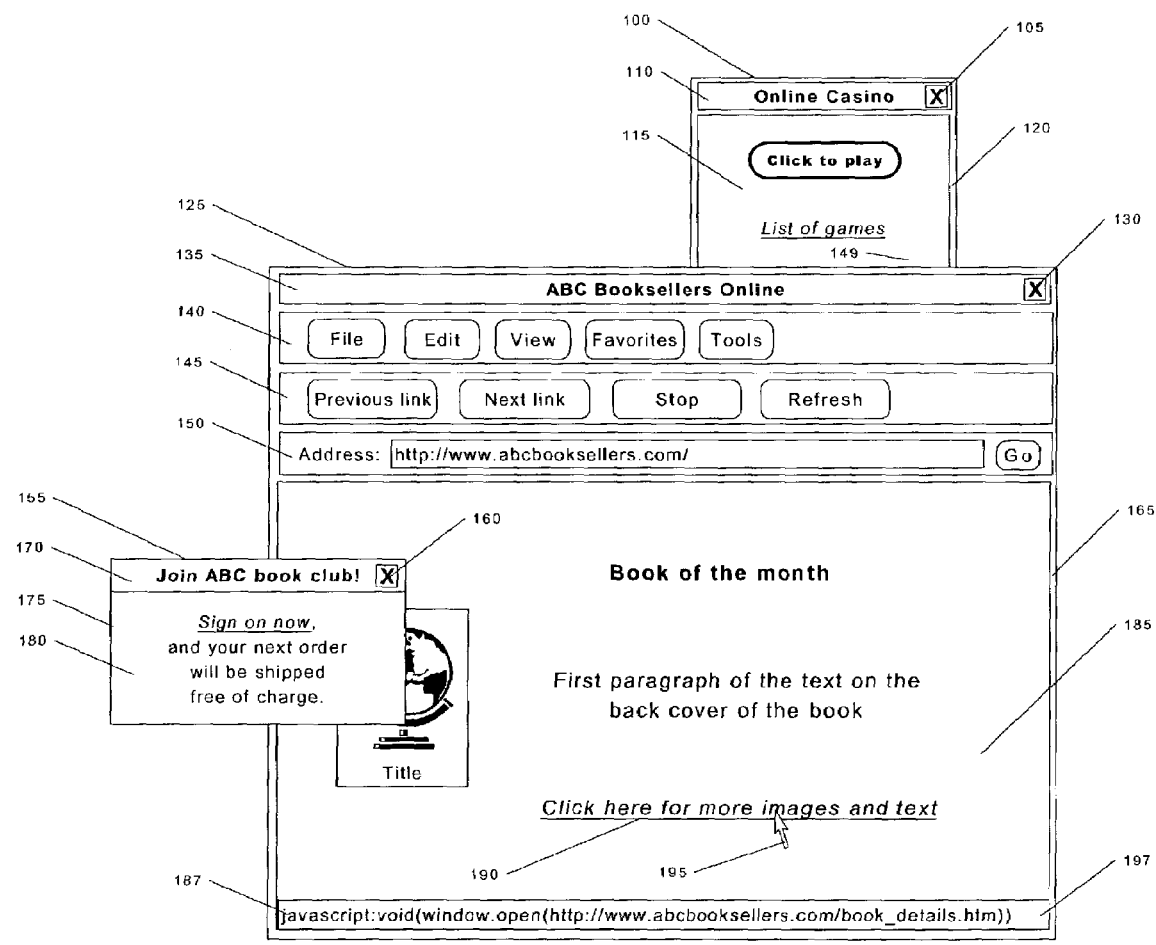
FIG. 1 illustrates display of multiple windows on a computer screen, according to a prior art embodiment.

In the following description, numerous details are set forth, such as distances between components, types of molding, etc. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

FIG. 1 illustrates display of multiple windows on a computer screen, according to a prior art embodiment.

Referring to FIG. 1, content 185 retrieved over a computer network in response to a user request is displayed in a primary browser window 125 that contains multiple interface elements outside of a document display area. These interface elements include a title bar 135 containing a "Close" button 130, a menu bar 140, a tool bar 145, an address bar 150, and a status bar 197. Names of exemplary interface elements follow naming conventions used in the Internet Explorer application. Primary window 125 has resizable borders 165, indicated by double borderlines.

Primary window 125 is overlapped by a secondary window 155, automatically opened after the retrieval of content 185. Secondary window 155 partially obscures the main content 185. To restore its visibility, a user must perform an additional action (e.g., to click inside primary window 125 to move it on top or to click on a button 160 to close secondary window 155).

The user recognizes secondary window 185 as a popup window based on a set of clues associated with the appearance and history of popup windows.

A popup window usually contains a smaller number of interface elements than a main window, allowing a more effective use of the small window area for content display. Loss of functionality (for instance, due to omission of the address bar) is tolerated because an expected way to navigate from a popup window is to click on the link provided inside the content. In the presented example, popup 155 contains title bar 170, but no menu bar, tool bar, address bar or status bar.

Content presented in a popup is often optimized for a fixed-size window, i.e., non-resizable window borders are used to prevent users from changing the size of the popup window. In the presented example, non-resizable border 175 is indicated by its narrow width (a single borderline instead of a double borderline).

Different popup windows may have different combinations of user interface elements, placement and size. For example, a popup window 100 presenting content 115 inside resizable borders 120 is located in the background and does not obscure primary window 125. Some web sites deliberately place their popup windows in the background, so that they become visible only after the primary window is closed.

Users often recognize a desktop window as a popup if it has either small number of interface elements, a relatively small size, or non-resizable borders.

Even if a window lacks some of these visual identifiers, it is usually recognized as a popup if it becomes visible without a user request. A popup window appearing without a user request can be opened, for example, by a function embedded in the main content, such as a handler of an "onload" event written in the JavaScript language. Alternatively, a popup window can be opened without a user request by a third-party application, e.g., an application developed by Gator Corporation of Redwood City, Calif.

If a new window is opened in response to a user request, it may or may not be recognized as a popup window depending on a request type being used. Specifically, a new window is not typically considered a popup if a user performs a special action to indicate that the new window is to be opened. For instance, in the Internet Explorer browser a user can request to display content in a new window by pressing a "Shift" key while performing a left mouse button click over a link, or by performing a right mouse button click over a link and selecting an "Open in New Window" item from the content menu. Alternatively, a new window opened in response to a user request is typically recognized as a popup if the new window was opened in response to a user request of the same type as a request used to change content in a primary window. For instance, a new window is recognized as a popup if it was opened after a regular left button click over a link, without the use of any keyboard key modifiers.

In the example shown on FIG. 1, cursor 195 is positioned over a link 190, while a status bar 197 displays a content retrieval instruction 187 associated with that link. In this example, content retrieval instruction 187 is a JavaScript function embedded in the content 185, containing a call to open a new window and retrieve new content. If a user clicks on link 190, the call to open a new window is executed and a new window is opened without a further user action. In this way, a decision to open a new window is made not by the user, but by a content provider who embedded an instruction to open a new window into the main document.

Figure 2:
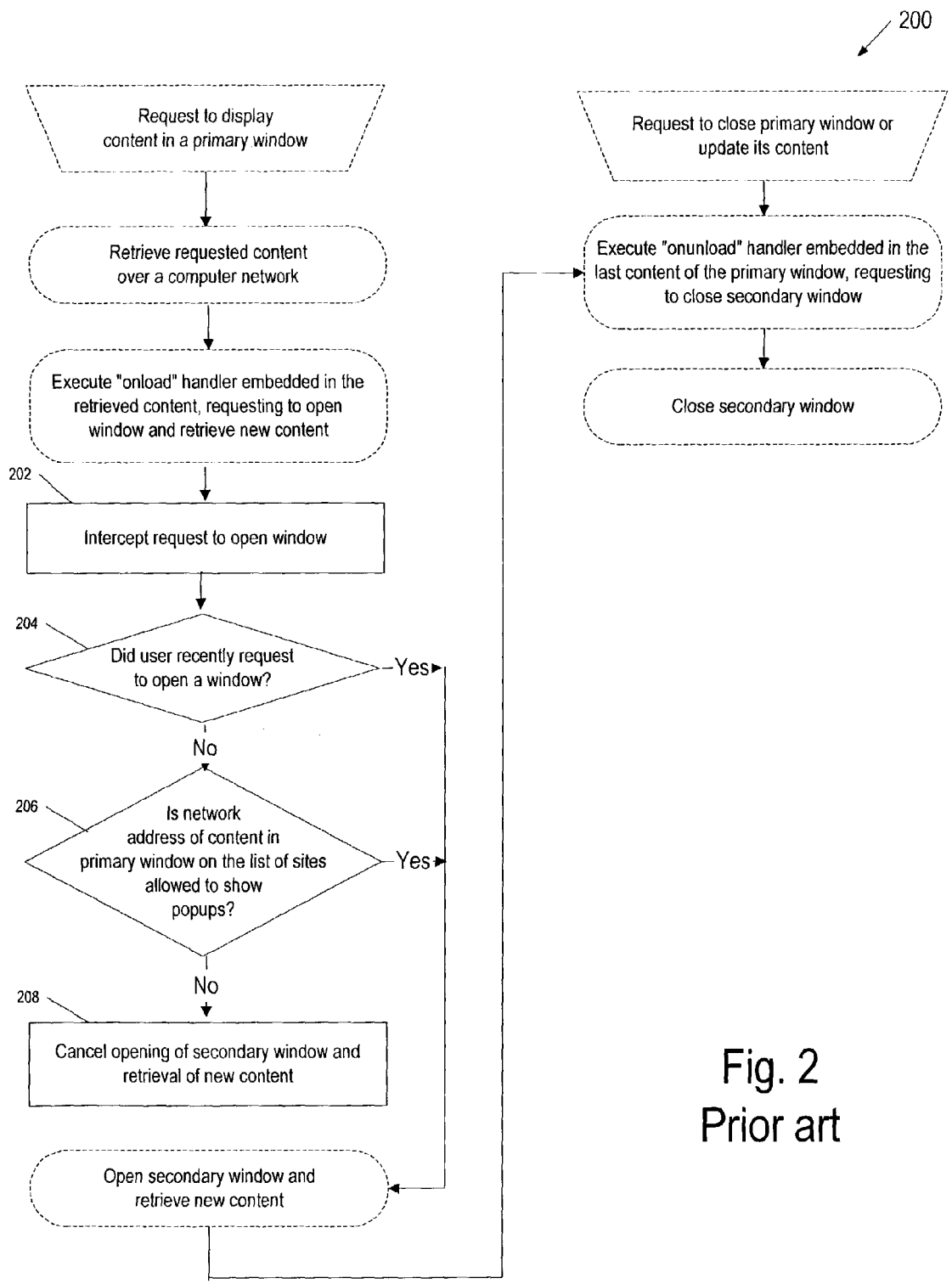
FIG. 2 is a block-diagram illustrating a process of controlling display of popup windows, according to a prior art embodiment.

FIG. 2 is a block-diagram illustrating a process 200 of controlling display of popup windows, according to a prior art embodiment. In this embodiment, operations controlling popup behavior are performed by a specially developed module such as a designated application, a Browser Helper Object or a plug-in.

Once a user requests to display content in a primary browser window, the browser retrieves the requested content from a computer network and loads it into a browser window. The retrieved content may include an embedded function (e.g., a function written in a JavaScript language) that contains an "onload" event handler consisting of a set of instructions that the browser will execute when an "onload" event is detected. An "onload" event handler may contain an instruction to open a secondary window and retrieve new content.

Blocks 202 through 208 illustrate a prior-art solution that limits an unauthorized display of popup windows. According to this solution, a special module (e.g., a Browser Helper Object supporting an interface with Internet Explorer), intercepts a request to open a new window (block 202) and determines whether a user has recently requested to open a secondary window (block 204). If this determination is negative, the module compares the network address of the content in the primary window with a pre-defined "white list" of sites that are allowed to open popups (block 206). If the network address is not on the "white list", the secondary window is closed or prevented from opening, and the retrieval of the new content is canceled (block 208). Otherwise, if the user has recently requested to open a secondary window, or if the network address is on the "white list", the browser opens the secondary window and retrieves the new content.

A secondary window opened at block 250 may be subsequently closed without an additional user request using an "onunload" event handler. That is, a content provider embeds an "onunload" event handler that will close a previously opened popup window after the user requests to change content in the primary window (e.g., by entering a new network address in the address bar and pressing "Go"). That is, once the browser issues an "onunload" event indicating that the last content in the primary window is unloaded, the "onunload" event handler executes a set of instructions requesting to close the secondary window.

As discussed above, this prior art solution requires management of pre-defined lists of allowed or restricted sites and depends on content providers to close popup windows without user requests.

One embodiment of the present invention provides for automatic closing of popup windows without reliance on content providers.

Figure 3:
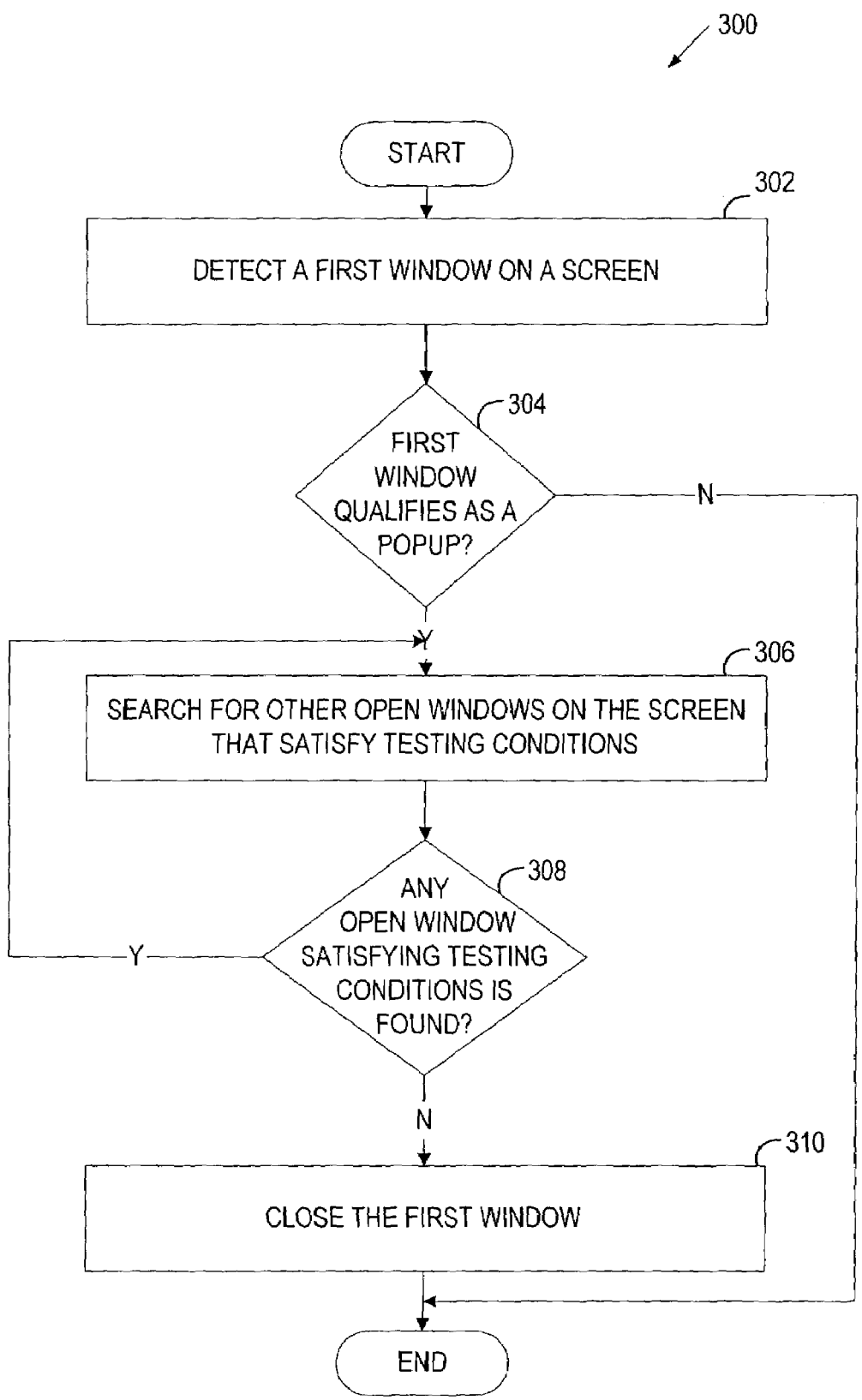
FIG. 3 is a flow diagram of one embodiment of a method for controlling display of popup windows.

FIG. 3 is a flow diagram of one embodiment of a method 300 for controlling display of popup windows.

Referring to FIG. 3, method 300 begins with detecting a first window on a computer screen (processing block 302). At decision box 304, a determination is made as to whether the first window qualifies as a popup. The determination may depend on the type of action used by the user when requesting to open the first window, on the interface elements present in the first window, on whether the size of the first window can be modified, on whether the user has issued any request for additional content after requesting content in a parent window, etc. A parent window is a window that was opened prior to the opening of the first window and whose presence on the screen triggered the opening of the first window. One embodiment of a method for qualifying the first window as a popup window will be discussed in more detail below in conjunction with FIG. 4.

If the first window does not qualify as a popup window, method 300 ends. Otherwise, if the first window qualifies as a popup window, a search for other open windows that satisfy one or more testing conditions is performed (processing block 306). As will be discussed in more detail below, in one embodiment, the testing conditions concern various characteristics of the open windows. For example, a testing condition may require relevancy of content displayed in the other open windows to the content displayed in the popup window. In one embodiment, the testing conditions apply only to non-popup windows that are currently present on the screen.

In one embodiment, processing block 306 is performed upon intercepting a user request to close at least one window on the screen. In another embodiment, processing block 306 is performed upon intercepting a user request to update content in at least one window on the screen. In yet another embodiment, processing block 306 is performed periodically until the first window is closed.

If any open window that satisfies the testing conditions is found (decision box 308), processing blocks 306 and 308 are repeated periodically or upon receiving a next user request to close a window or update its content. Once no open window satisfying the testing conditions is found, the popup window is closed without a user request (processing block 310). In the above example, the popup window will be closed when no open window displaying content that is relevant to the content of the popup window is found.

In one embodiment, if any on-screen window other than the first window is qualified as a popup window, this other popup window will be closed without a user request when non-popup windows are no longer present on the screen.

Figure 4:
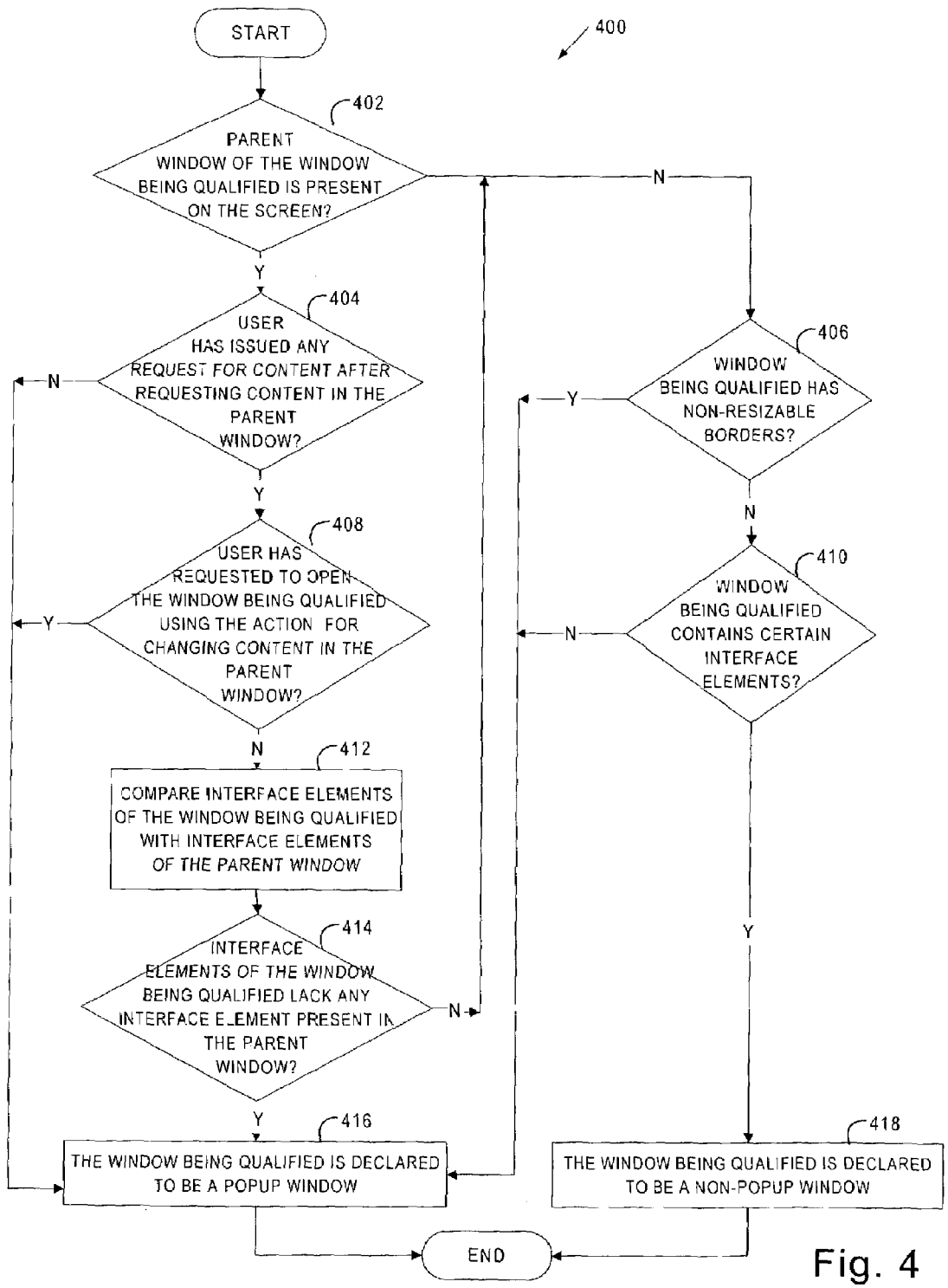
FIG. 4 is a flow diagram of one embodiment of a method for qualifying an on-screen window as a popup window.

FIG. 4 is a flow diagram of one embodiment of a method 400 for qualifying an on-screen window as a popup window. Method 400 begins with determining whether a parent window of the window being qualified is present on the screen (decision box 402). If the parent window is present, a determination is made as to whether a user has issued any request for content after requesting content in the parent window (decision box 404).

If the user did not issue any request for content after requesting the content in the parent window, the window being qualified is declared to be a popup window (processing block 416). Otherwise, another determination is made as to whether the user has requested to open the window being qualified using the same action (e.g., a click on a link in the parent window) as the one required for changing content in the parent window (decision box 408).

If the user used such action, the window being qualified is declared to be a popup window (processing block 416). If the user used a different action, interface elements of the window being qualified are compared with interface elements of the parent window (processing block 412). If the interface elements of the window being qualified lack any interface element present in the parent window (decision box 414), the window being qualified is declared to be a popup window (processing block 416).

If the interface elements of the window being qualified match interface elements of the parent window, or if the parent window is not present on the screen, a determination is made as to whether the window being qualified has non-resizable borders (decision box 406). If the window being qualified has non-resizable borders, the window is declared to be a popup window (processing block 416).

If the window being qualified has resizable borders but does not contain one or more of such interface elements as a menu bar, a tool bar, an address bar or a status bar (decision box 410), the window is declared to be a popup window (processing block 416).

If the window being qualified does not miss the above interface elements, the window being qualified is declared to be a non-popup window (processing block 418).

It should be noted that the blocks shown in FIG. 4 (as well as the other drawings presented herein) may or may not be executed in the illustrated order.

As described above with reference to FIG. 3, if the window being qualified is declared to be a popup window, it will be closed without user intervention when no other window satisfying certain testing conditions is present on the screen.

Figure 5:
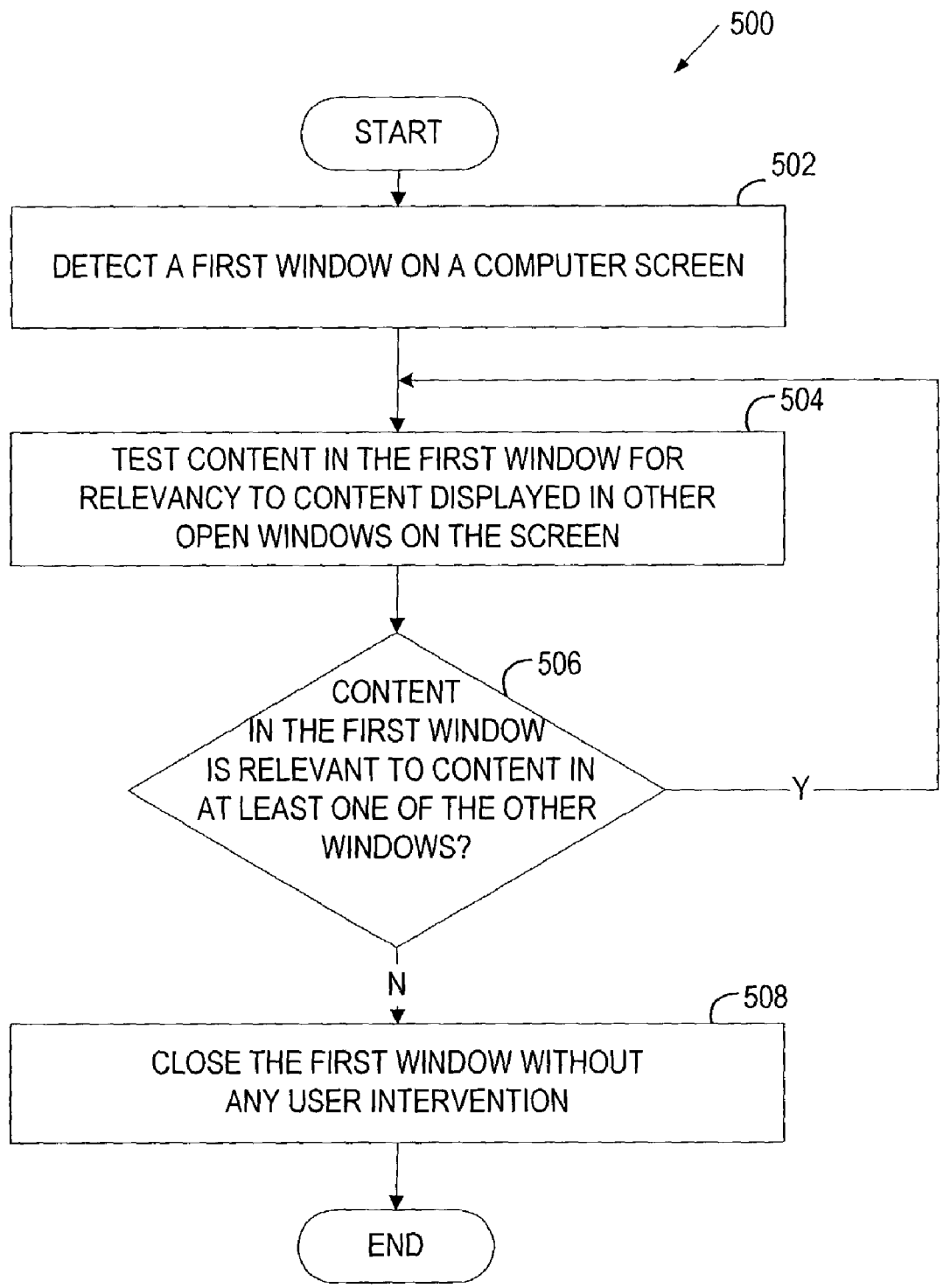
FIG. 5 is a flow diagram of one embodiment of a method for controlling display of an on-screen window.

In one embodiment, the display of any on-screen window, a popup or a non-popup, can be controlled based on characteristics of content displayed in other windows on the screen. FIG. 5 is a flow diagram of one embodiment of a method 500 for controlling display of an on-screen window.

Referring to FIG. 5, method 500 begins with detecting a first window on a computer screen (processing block 502). The first window may be a popup window or a non-popup window. At processing block 504, content in the first window is tested for relevancy to content displayed in other open windows on the screen. In one embodiment, the testing is performed by comparing a predefined portion of the network address of the content in the first window with a corresponding portion of the network address of the content in each other window. In one embodiment, the predefined portion of the network address contains at least a second-level domain name. A second-level domain name is a network address portion that usually remains the same for a content provider employing multiple domain names for related content. For example, network addresses "http://www.abcbooksellers.com" and "http://news.abcbooksellers.net/book_details.htm" have the same second-level domain name "abcbooksellers". In other embodiments, the pre-defined portion of the network address may contain other network address portions (e.g., a combination of a second-level domain name and a top-level domain name).

If the content in the first window is relevant to the content in at least one of the other windows on the screen (decision box 506), the first window remains open. Otherwise, the first window is closed without any user intervention (processing block 508).

Figure 6:
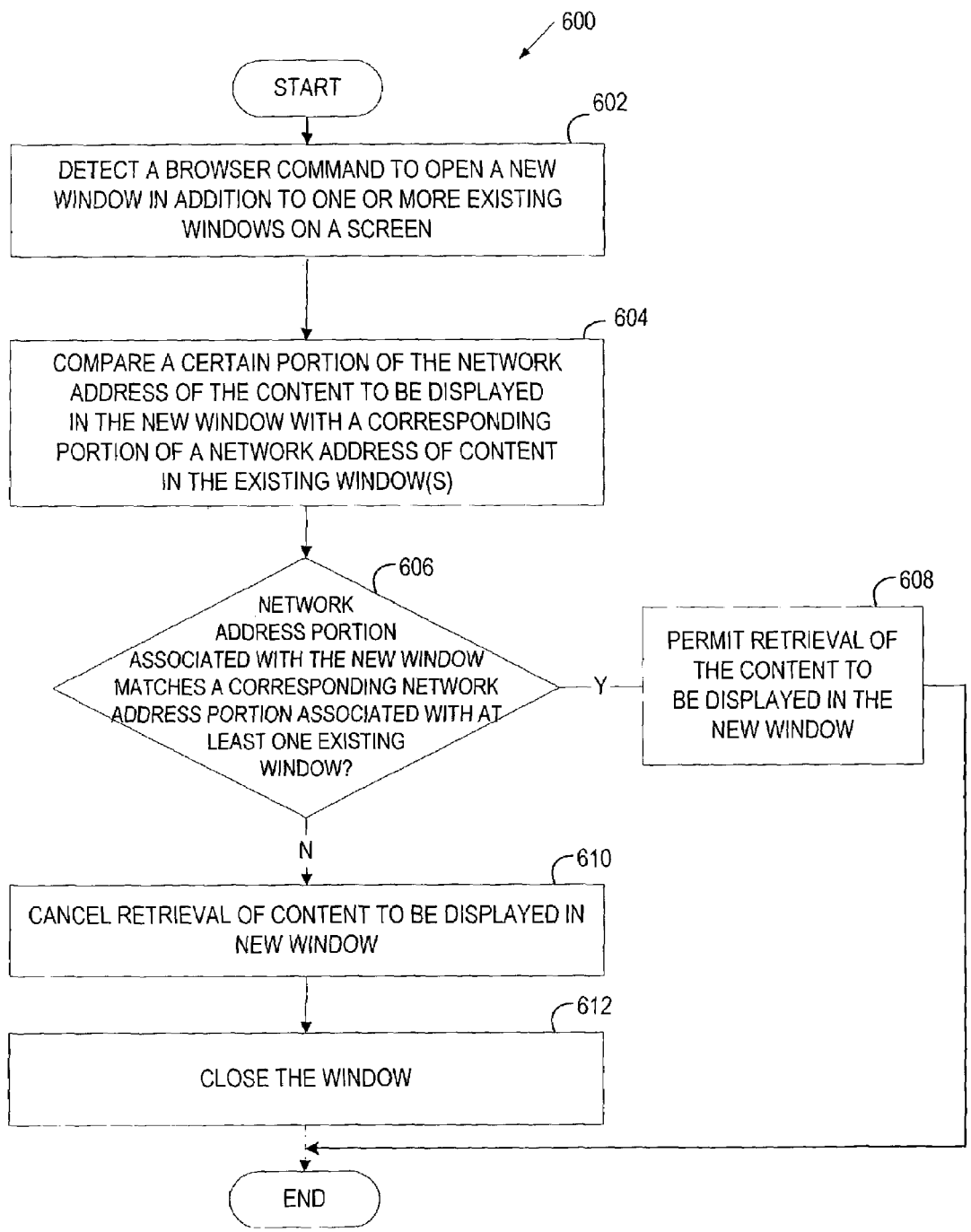
FIG. 6 is a flow diagram of one embodiment of a method for controlling retrieval of content to be displayed in a popup window.

One embodiment of the present invention rejects a request to open a popup window if its content is not relevant to content displayed in other windows. By canceling such requests before a popup window is opened and content retrieval is initiated, consumption of bandwidth is avoided and user distraction is prevented. FIG. 6 is a flow diagram of one embodiment of a method 600 for controlling retrieval of content to be displayed in a popup window.

Referring to FIG. 6, method 600 begins with detecting a browser command to open a new window in addition to one or more existing windows on a screen (processing block 602). The browser command includes a network address of content to be displayed in the new window. In one embodiment, the existing window is a parent window of the new window. In another embodiment, the new window is opened independently of the existing windows.

In one embodiment, once a browser command to open a new window is detected, a determination is made as to whether the new window as a popup window (e.g., using a qualification process described above in conjunction with FIG. 4). In this embodiment, if the new window is a non-popup window, method 600 ends. Otherwise, method 600 continues with processing block 604. In another embodiment, no qualification of the new window is performed.

At processing block 604, a certain portion of the network address of the content to be displayed in the new window is compared with a corresponding portion of a network address of content in the existing window(s). In one embodiment, the certain portion of the network address contains at least a second-level domain name.

If the network address portion associated with the new window matches a corresponding network address portion associated with at least one existing window (decision box 606), retrieval of the content to be displayed in the new window is permitted (processing block 608). Otherwise, retrieval of this content is canceled (processing block 610) and the new window is closed (processing block 612).

As will be discussed in more detail below, a content provider may retrieve content to be displayed in a popup window from a network address other than the network address initially included in the browser command. That is, an initial browser command to retrieve content of the popup window may be sent to the content provider's server using the network address whose specific portion, such as a second-level domain name, matches the same network address portion of the content in the parent window. The content provider's server sends a response to the browser with a redirection status code and a changed network address of the requested content. The browser then requests the content of the popup window using the changed network address. Redirection is typically done for billing purposes when a content provider uses a database of advertisers and keeps track of retrieval of advertisements provided by different advertisers.

One embodiment of the present invention considers possible redirection of a browser request for content of the new window by intercepting and examining a content server response to the browser command. If the content server response contains a modified network address whose specific portion does not match the same network address portion associated with at least one existing window, the retrieval of the content is canceled and the new window is closed.

Figure 7:
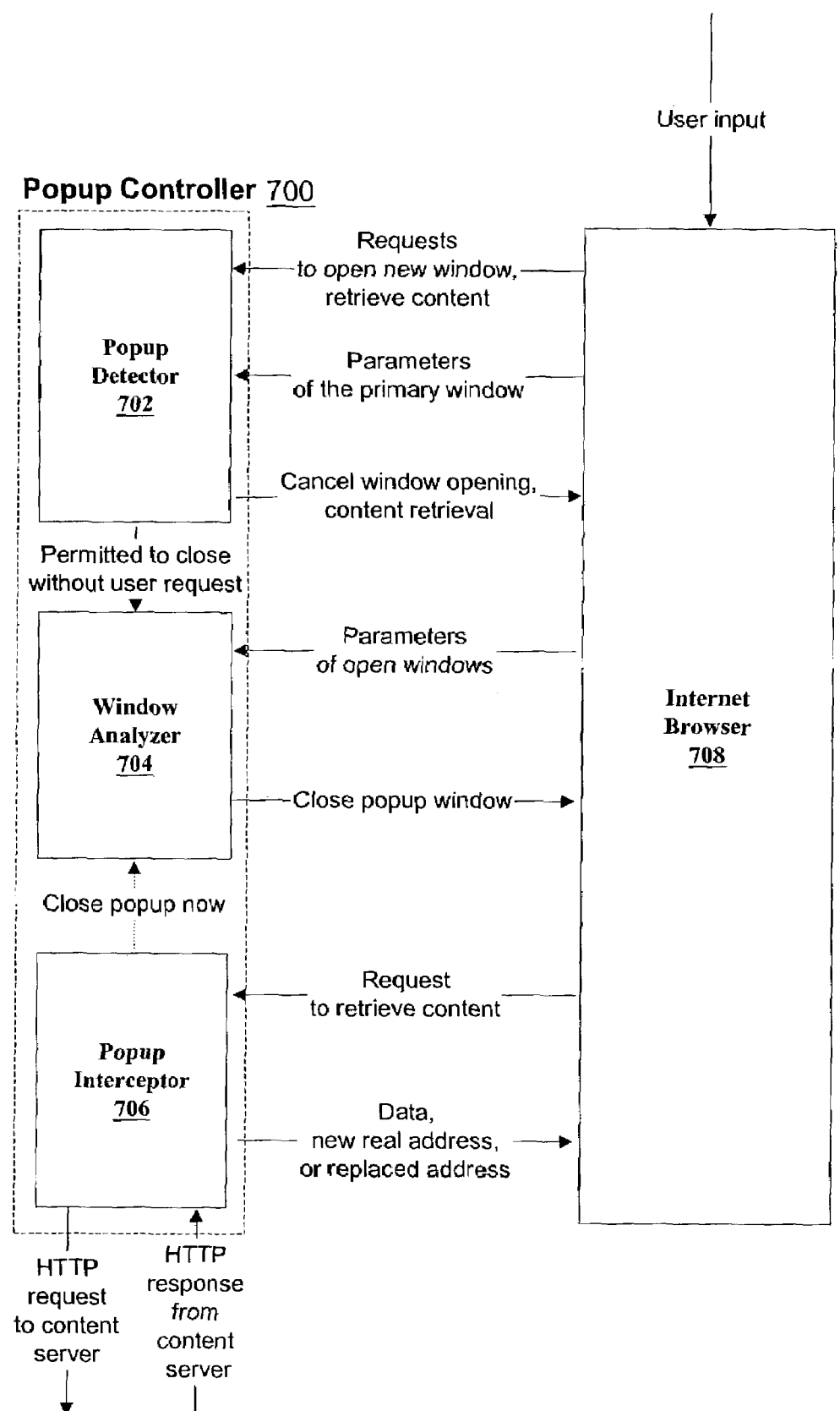
FIG. 7 is a block diagram of one embodiment of a popup controller module 700 that is responsible for controlling display of windows on a screen.

FIG. 7 is a block diagram of one embodiment of a popup controller module 700 that is responsible for controlling display of windows on a screen. Popup controller 700 contains a popup detector 702, a window analyzer 704 and a popup interceptor 706 that communicate with each other and a browser 708.

Popup detector 702 intercepts requests to open new windows (e.g., by intercepting a browser event "NewWindow2") and requests to retrieve new content (e.g., by intercepting a browser event "BeforeNavigate2"), determining whether new windows can be qualified as popup windows. To make this determination for a new window, popup detector 702 may request and receive characteristics of a primary window that initiated a new window request. The characteristics may include, for example, a list of displayed interface elements or a second-level domain of the primary content. Popup detector 702 may also request and receive information about the type of a user action, if any, that initiated a new window request.

If a new window is recognized as a popup window, popup detector 702 decides if the opening of the popup window can be canceled without retrieving content of this window. As described above, the content retrieval can be canceled if, for example, a second-level domain of the content is different from the second-level domain of the content in the primary window. Popup detector can request to cancel content retrieval or window opening by, for example, modifying parameters of intercepted events before returning them to the browser, as will be discussed in more detail below.

If a popup window is detected and its display is allowed to proceed, popup detector 702 reports that the popup window is permitted to be closed at a later time without a user request. After receiving this information, window analyzer 704 issues periodic requests to Internet browser 708 to find out if at least one window, other than the current popup window, satisfies one or more testing conditions. The popup window is closed if no open window satisfying testing conditions is found. To close the popup window, window analyzer 704 may invoke, for example, a Quit method for the IWebBrowser2 interface of a component object model (COM) for the object representing the current popup window.

Popup interceptor 706 is responsible for canceling popup content retrieval after re-direction to another domain.

In one embodiment, popup detector 702 and window analyzer 704 are implemented as parts of a browser helper object (BHO), and popup interceptor 706 is implemented as a part of a proxy server such as a hyper-text transfer protocol (HTTP) proxy server residing on the user computer, which intercepts all HTTP requests to content servers and all HTTP responses from the content servers. To inform popup interceptor 706 that a current HTTP request has to be canceled if redirected to a different second-level domain, popup detector 702 sets a temporary indicator (e.g., a cookie), which is intercepted together with an HTTP request. In one embodiment, if popup interceptor 706 discovers re-direction of the content having this indicator, it replaces the redirection address with the address of a local file, enabling window analyzer 704 to close the popup window. In another embodiment, popup interceptor 706 may return the "Address not found" error to Internet browser 708 and send a direct message to window analyzer 704, requesting to close the current popup window.

In another embodiment, popup controller 700 can be partially or fully implemented as a dynamic link library (DLL) intercepting communications between browser 708 and the Internet.

Figure 8:
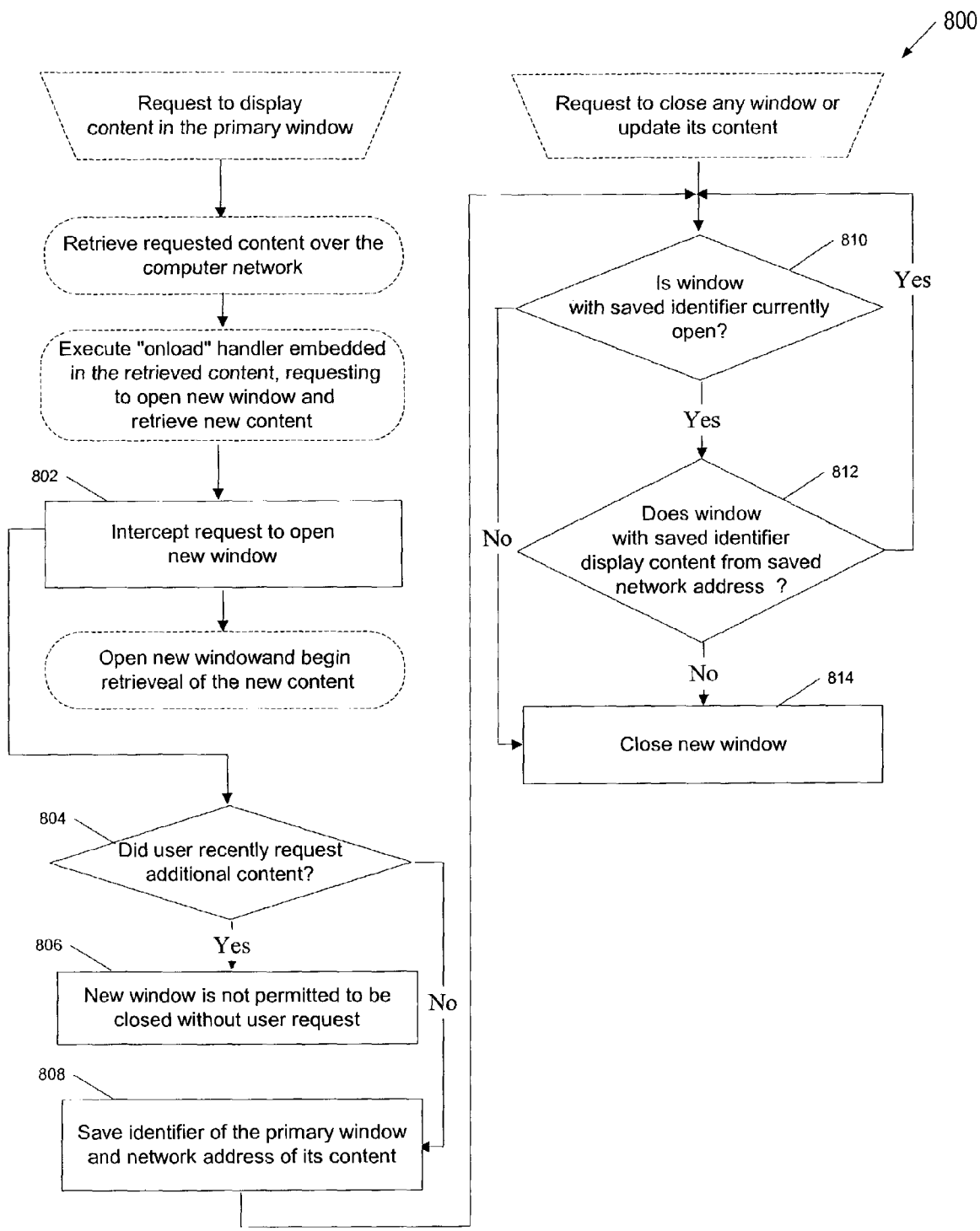
FIGS. 8-10 are flow diagrams of methods for closing a popup window after testing characteristics of a primary window, according to various embodiments of the present invention.
Figure 9:
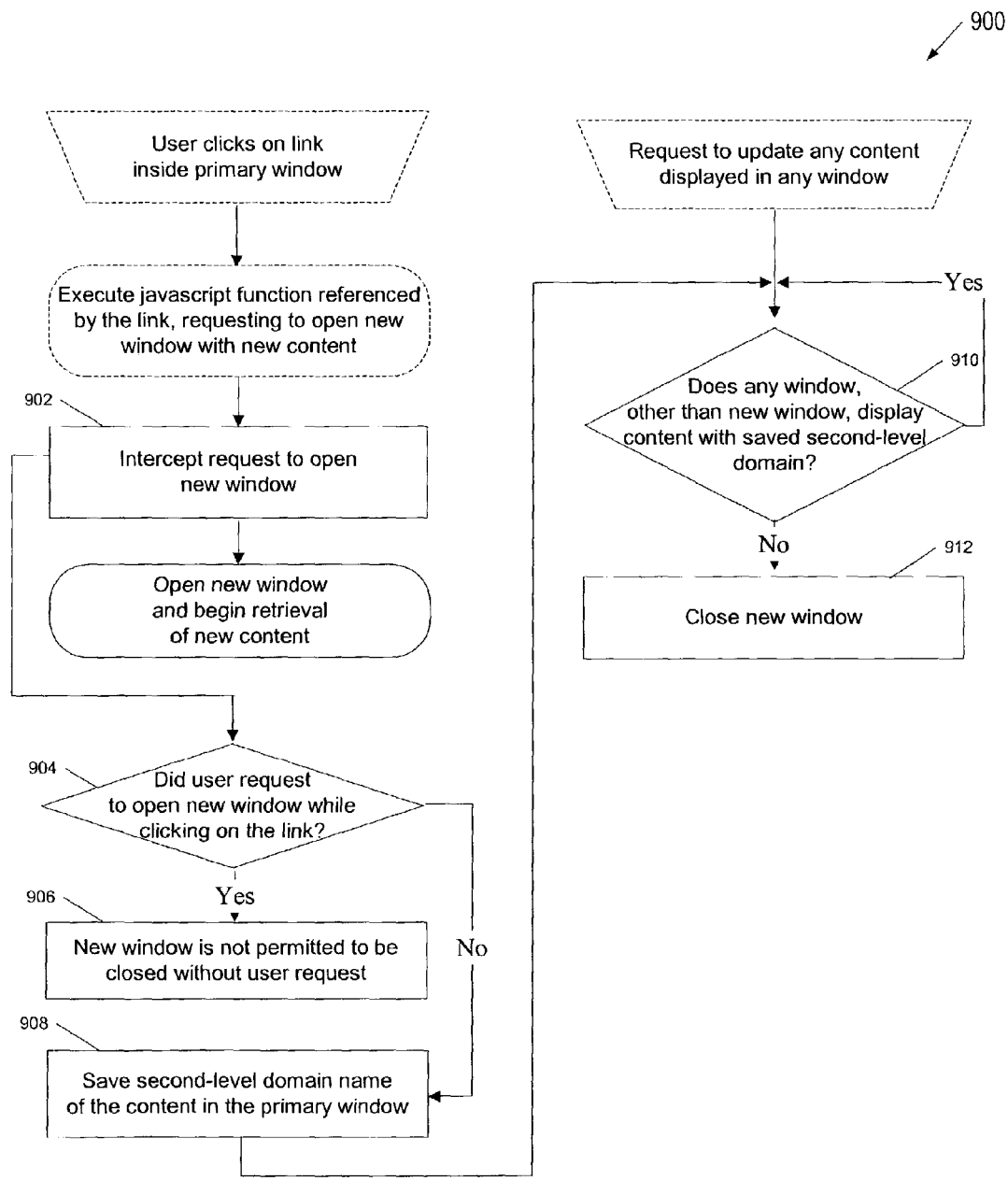
Figure 10:
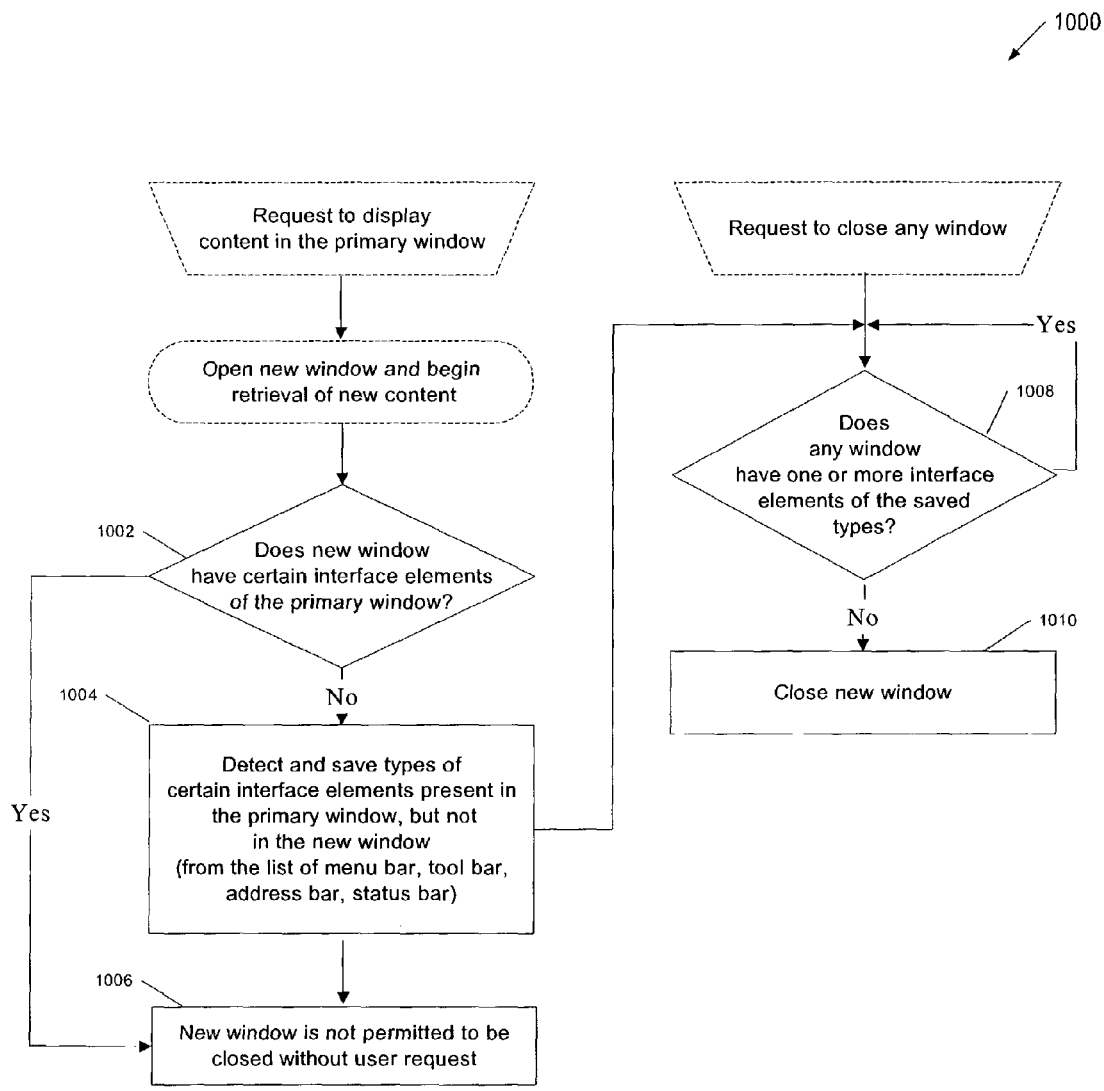

FIGS. 8-10 are flow diagrams of methods for closing a popup window after testing characteristics of a primary window, according to various embodiments of the present invention.

Referring to FIG. 8, once a user has requested to display content in a primary browser window (also referred to herein as a parent window), the browser retrieves the requested content from a computer network and loads it into a browser window. The retrieved content may include a script function (e.g., a function written in a JavaScript language) that contains an "onload" event handler consisting of a set of instructions that the browser will execute when an "onload" event is detected. An "onload" event handler may contain an instruction to open a secondary window and retrieve new content.

In response, popup controller module 700 (e.g., implemented as a BHO) detects opening of a new window (block 802) and performs a test to determine if the new window qualifies as a popup by determining whether a user has requested additional content after requesting to retrieve content in the primary window (block 804). If such a request was detected, the new window is not a popup and is not permitted to be closed without a user request (block 806). Otherwise, the identifier of the primary window and the network address of its content are saved (block 808) to be used when deciding whether to close the new window.

A decision to close the new window is made after testing if at least one open window, other than the new window, satisfies one or more testing conditions. In the described embodiment, the new window will be closed if the primary window is closed (block 810) or no longer displays content that caused opening of the new window (block 812).

In one embodiment, tests of blocks 810 and block 812 are performed after intercepting a user request to close at least one window (e.g., a primary window) or update content in at least one open window (e.g., in any non-popup window). Alternatively, these tests are performed periodically, without monitoring user requests and browser events, until the new window is closed (block 814). In this case, the popup window may remain open when the user refreshes the same content in the primary window, which is difficult to accomplish in the prior-art solution that relies on an "onunload" handler.

As discussed above, the decision to close the new window is made by analyzing characteristics of other windows. Accordingly, the life cycle of a popup window is dependent on the content displayed elsewhere on the desktop (i.e., the popup window is closed when its content is no longer relevant to the content displayed in other windows).

In one embodiment, the testing conditions vary depending on an application or a user input. For example, test 812 may be omitted, and a popup window will be kept visible until a primary window is closed, even if primary window no longer displays the content that initiated the opening of the popup window.

Automatic popup removal makes popup windows more acceptable to users. There is no longer a need to manually close each popup: all popups related to the current primary content disappear when that primary content is replaced. As a result, the users will not be reluctant to see more popup windows, and the important revenue stream for content providers will be preserved.

Referring to FIG. 9, a user requested content by clicking on a link inside a primary window. The link is associated with a JavaScript function to open a new window (e.g., as discussed above with reference to link 190 of FIG. 1). Accordingly, as a result of a user click, this function is executed, causing opening of the new window and retrieval of content of the new window.

At block 902, popup controller 700 intercepts the request to open the new window (e.g., by intercepting "NewWindow2" event sent by Internet Explorer). At block 904, popup controller 700 determines whether the new window is a popup window by deciding whether the user opened the new window using the same type of action as the one required for changing content in the primary window (e.g., by performing a standard click on the left mouse button while the cursor is positioned over the link). If the user performed the type of action required for changing content in the primary window, then it is unlikely that the user wanted to open a new window for the changed content. Rather, the new window was opened not because the user requested it, but because an instruction to do so was embedded in the content containing the link. Hence, then new window can be considered a popup window. Alternatively, if the new window was opened in response to a different type of action (e.g., by pressing a designated keyboard key when clicking on the left mouse button over the link, or by clicking on the right mouse button over the link and selecting the "Open in New Window" item from the content menu), then the new window was probably open in response to the user request, and as such will be considered a non-popup window and will not be permitted to be closed without a user request (block 906).

If the new window is a popup window, a second-level domain name of the content in the primary window is saved (block 908). Further, popup controller 700 searches for any window, other than the popup window, that displays content with the saved second-level domain name (block 910). If no such window is found, the new window is closed (block 912). The search may be performed periodically or in response to a user request to update content in any other window or close any other window.

Thus, the popup window remains visible as long as any other open window displays content from the related domain. In this way, for instance, a popup-based offer to subscribe to premium services will remain visible as long as the user browses different sites of the same content provider, disappearing when the user leaves the group of related sites.

If the new window is not permitted to be closed without a user request, popup controller 700 may either skip the tests of other open windows or cancel a command to close the new window when indicated by such tests.

Referring to FIG. 10, a new window may be opened even if the instructions to do so are not embedded in the content of the primary window. Such a new window may be a popup window produced by a designated application (e.g., an application developed by Gator Corporation). Because such window is not opened by executing a specific embedded instruction, it may not always be possible to intercept a request to open this window. Accordingly, method 1000 does not attempt to intercept a request to open a new window. Rather, method 1000 detects a new window opened on the screen and analyses interface elements of this new window to determine whether this new window can be classified as a popup window. In one embodiment, this determination is done by deciding whether certain interface elements of the primary window are present in the new window (block 1002). For example, if any two interface elements from a list including a menu bar, a tool bar, an address bar and status bar are found in the primary window but not in the new window, the new window is classified as a popup window.

If the new window is not classified as a popup window, the new window is not permitted to be closed without a user request (block 1006).

If the new window is classified as a popup window, types of the certain interface elements that are present in the primary window but not in the new window are saved (block 1004). Next, interface elements of other windows are checked for interface elements of the saved types to detect any non-popup windows present on the screen (block 1008). These checks can be performed periodically, or every time when a window on the screen is closed. When no non-popup windows remain open, the new window is closed (block 1010). In addition, in one embodiment, the remaining popup windows, if any, will also be closed if no non-popup windows are present on the screen. Accordingly, popup windows can be visible until the end of the browsing session, when the user closes the last browser window opened in response to a direct user request. It is a convenient way to suppress so-called "pop-under" windows (i.e., popup windows intentionally opened in the background to attract user attention at the end of the browser session). Such "pop-under" windows, unless intentionally moved into the foreground by the user, will be automatically closed without attracting user attention.

In another embodiment, the classification of the new window can be accomplished by analyzing only the features of the new window, without analyzing interface elements of other windows. In one embodiment, the new window is classified as a popup window if it does not contain such interface elements as a menu bar, a tool bar, an address bar or a status bar. In another embodiment, the new window is classified as a popup window if it has non-resizable borders. That is, a window opened in response to a specific user request (e.g., by opening a new browser session, by pressing a keyboard key during a mouse click, or by selecting an entry in a content menu) is unlikely to have non-resizable borders. Therefore, if a new window with non-resizable borders is detected, it can be classified as a popup window, without checking interface elements of other windows. Once the new window is classified as a popup window, the other windows are checked for specific distinguishing features (e.g., specific interface elements or non-resizable borders) to detect non-popup windows on the screen. When only popup windows remain open on the screen, these popup windows will be closed.

Figure 11:
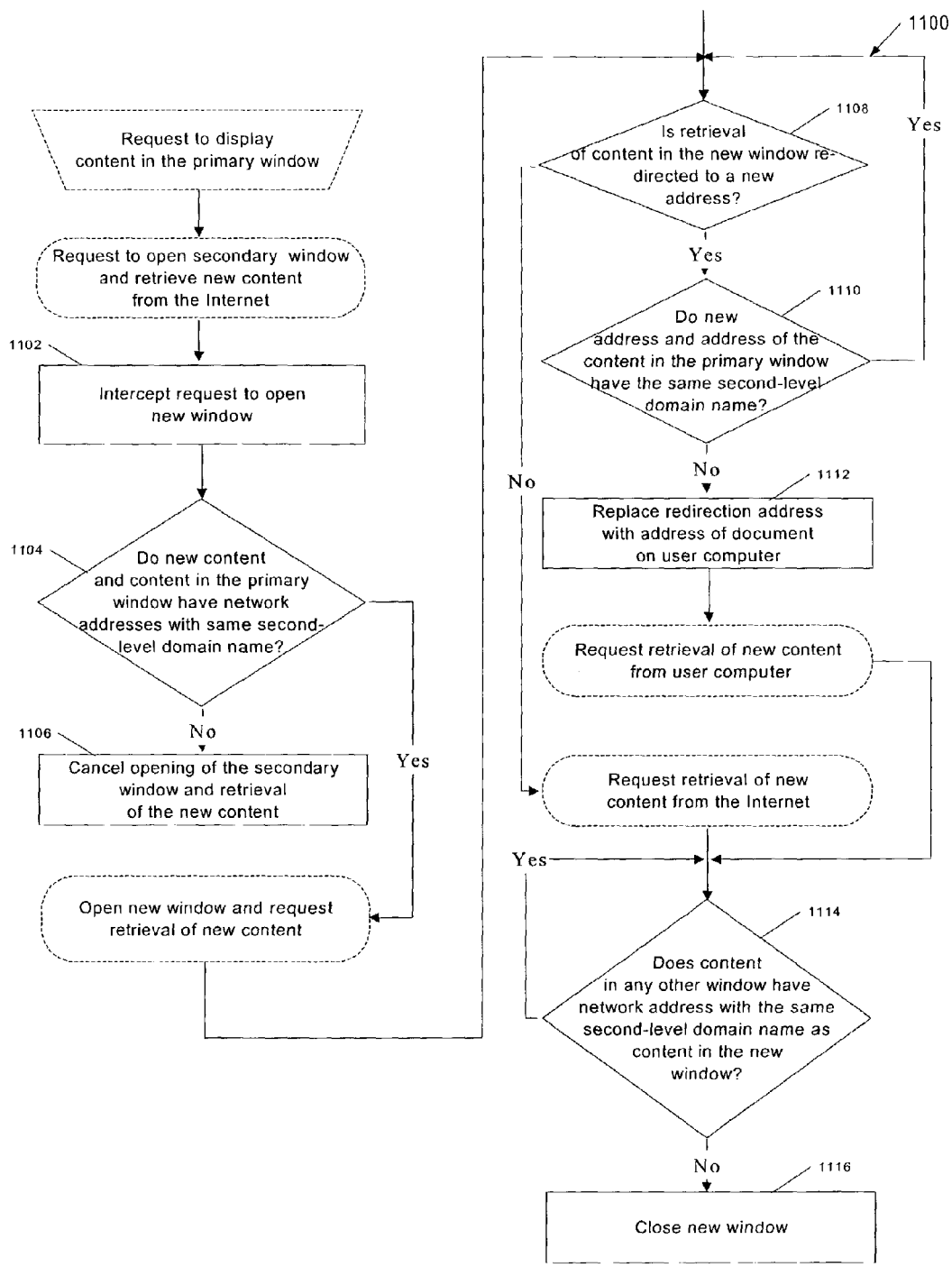
FIG. 11 is a flow diagram of one embodiment of a method for canceling retrieval of content for popup windows.

FIG. 11 is a flow diagram of one embodiment of a method for canceling retrieval of content for popup windows.

Referring to FIG. 11, popup controller 700 intercepts a browser command to open a new window and retrieve new content (block 1102) and determines whether the network addresses of the new content and of the content in the primary window have at least a common portion (e.g., a common second-level domain name) (block 1104). If these network addresses do not have a common second-level domain name, opening of the secondary window is canceled and retrieval of the new content is aborted (block 1106). Accordingly, only popup windows closely related to the content in the primary window will be opened. For instance, in the example presented in FIG. 1, the user will see an offer to join a book club affiliated with ABC booksellers, but not an unrelated popup "Online Casino", which retrieval was also initiated when content in the primary window was loaded.

In some embodiments of the present invention, a new window is rejected only if it also satisfies some other conditions in addition to the condition of block 1104. For example, these conditions may require the new window to be classified as a popup window using the classification process described above.

Rejecting popups with different second-level domain names provides a convenient way to filter out non-relevant content without maintaining a specially-prepared list of trusted or restricted sites. At the same time, this method can co-exist with the list-based popup filtering, e.g., the similarity of the second-level domain names can be evaluated only if the network address of the content in the primary window is not found in the maintained lists.

In some embodiments of the present invention, a different portion of the network address can be used to determine relevancy of the requested popup. For example, this portion may include both a second-level domain name and a top-level domain name, or the last three 3-digit groups of the IP address.

Further referring to FIG. 11, if the content to be displayed in the new window is relevant to the content in the primary window, popup controller 700 does not interfere with the browser opening the new window and requesting retrieval of content for the new window.

As discussed above, some content providers use a redirection approach. That is, an initial browser command to retrieve content of the popup window may be sent to a content provider's server using the network address whose specific portion, such as a second-level domain name, matches the same network address portion of the content in the primary window. The content provider's server sends a response to the browser with a redirection status code and a changed network address of the requested content. The browser then requests the content of the popup window using the changed network address.

To address possible redirection of the browser request for content of the new window, popup controller 700 examines browser requests and content server responses to detect any redirection to a different address (block 1108). Once a redirection is detected, popup controller 700 checks if the new network address and the network address of the content in the primary window have the same second-level domain name or some other network address portion (block 1110). If they do not, the retrieval of the redirected content is canceled. Otherwise, the redirection is allowed to proceed. If, subsequently, the content is redirected again, the redirection processing will be repeated.

In one embodiment, the retrieval of the redirected content is canceled by replacing the redirection address with an address of a document stored at a known location on the user computer (block 1112). The changed redirection request is passed to the browser, which treats it as a standard redirection and requests retrieval of the content from the new address. Such request does not consume external bandwidth because the new content is retrieved from the user computer.

At the same time, popup controller 700 detects the new window on the screen and performs periodic tests of other open windows on the screen to decide whether the new window can be closed without a user request, as discussed above. In one embodiment, the new window will be closed if content in any other open window has a network address with the same second-level domain name (block 1114). Because the address of the new content was previously (i.e., at block 1112) replaced with a unique address on the user computer, no other window will have the same second-level domain name, and the new window be closed (block 1116). For example, if the content in the new window was initially associated with the address "http://members.abcbooksellers.com", requested from the primary window displaying content with the address "http://www.abcbooksellers.com", but was subsequently re-directed to a new address "http://www.magazinesubscriptions.com", having a different second-level domain name, this new address will be replaced by an address of a file stored at a known location on the user computer, such as "C:/Replacement/replacement.htm". This file is retrieved internally, without consuming any connection bandwidth, and will be closed as soon as popup controller 700 detects that no other open window displays content with the same second level domain name.

In one embodiment, only domains of non-popup windows are tested, so that multiple popup addresses can be replaced with the same local address before any popup window is closed.

Accordingly, current characteristics (e.g., a current second-level domain name) of a popup window, rather than the characteristics saved at the time the popup window was opened, are used to test parameters of other windows, providing for closing of the popup window even if it has reloaded the content from another address after the opening (e.g., after a predefined delay from the last reload).

In another embodiment, popup controller 700, instead of replacing the redirection address, replaces a redirection response with an error message (e.g., "address not found") while issuing a separate request to close the new window. This embodiment does not require testing if any other window has the same second-level domain name, but can still be supplemented by tests to integrate popup rejection and automatic popup removal.

Figure 12:
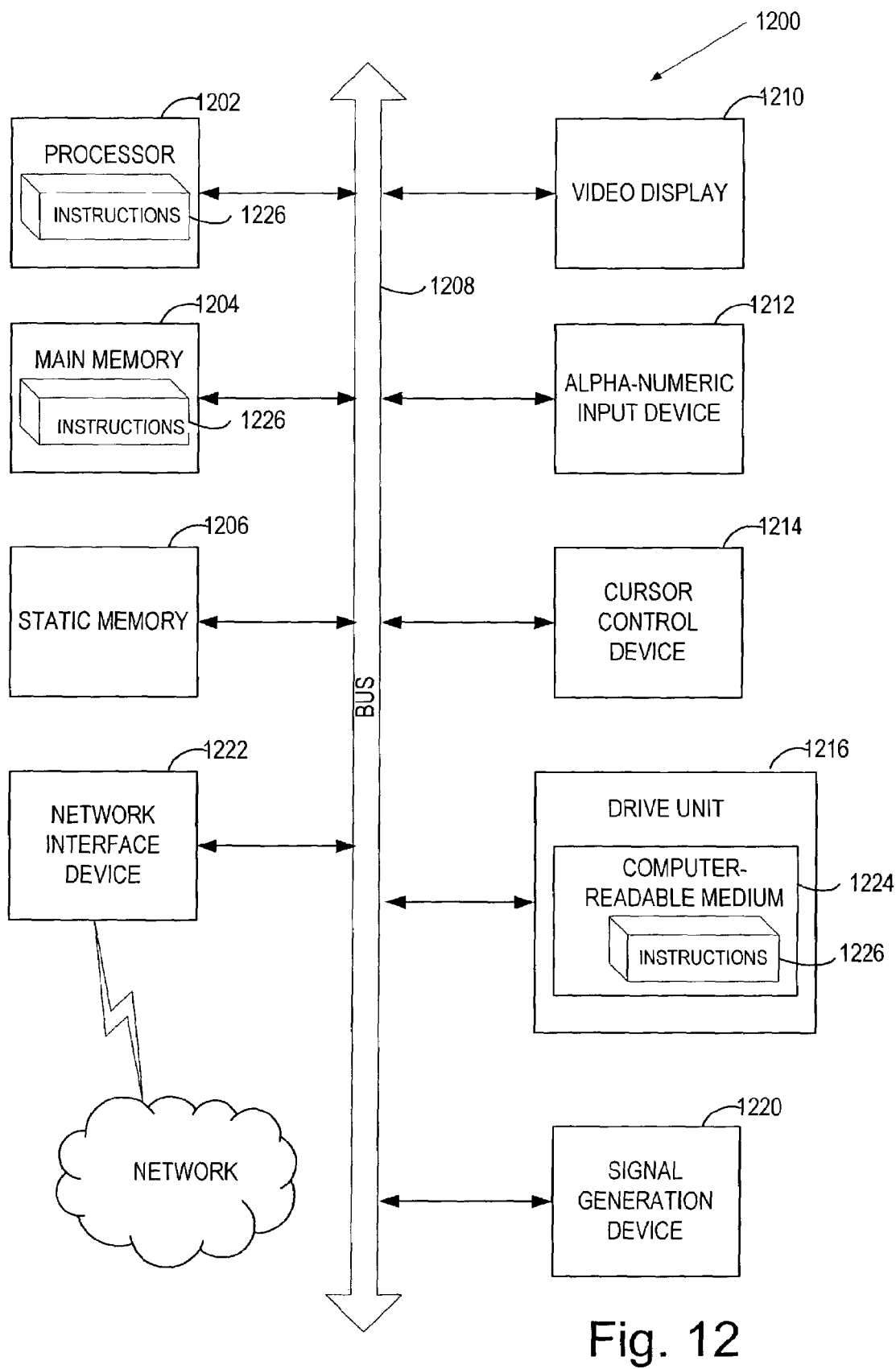
FIG. 12 is a block diagram of one embodiment of a computer system implementing the present invention.

FIG. 12 shows a diagrammatic representation of machine in the exemplary form of a computer system 1200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1200 includes a processor 1202 and a main memory 1204, which communicate with each other via a bus 1208. The computer system 1200 may further include a video display unit 1210 (e.g., a liquid crystal display (LCD) or a cathode ray tube (CRT)). The computer system 1200 also includes an alpha-numeric input device 1212 (e.g., a keyboard), a cursor control device 1214 (e.g., a mouse), a disk drive unit 1216, a signal generation device 1220 (e.g., a speaker) and a network interface device 1222. The disk drive unit 1216 includes a computer-readable medium 1224 on which is stored a set of instructions (i.e., software) 1226 embodying any one, or all, of the methodologies described above. The software 1226 is also shown to reside, completely or at least partially, within the main memory 1204 and/or within the processor 1202. The software 1226 may further be transmitted or received via the network interface device 1222. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

While some embodiments of the present invention are described in relation to managing popup windows with content retrieved over computer networks, these embodiments may also be applied to windows displaying content already stored on the user computer. For example, embodiments of the present invention can be used to automatically close a first window with a spreadsheet related to text in a second window. The test of relevancy between the spreadsheet and the text in the second window will be periodically performed while the text is changed or replaced by the user, and the first window will be closed when the spreadsheet is no longer relevant to the text in the second window.

Thus, methods and systems for managing display of on-screen windows have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
   detecting a first window on a screen;
   testing content in the first window for relevancy to content in one or more other open windows on the screen; and
   closing the first window upon determining that the content in the first window is not relevant to the content in the one or more other open windows,
   wherein determining that the content in the first window is not relevant to the content in the one or more other open windows comprises detecting a difference between a predefined portion of a network address associated with the content in the first window and a corresponding portion of a network address associated with the content in the one or more other open windows.

2. The method of claim 1 wherein the predefined portion of the network address contains at least a second-level domain name.

3. A method comprising:
   detecting a first window on a screen;
   testing content in the first window for relevancy to content in one or more other open windows on the screen; and
   closing the first window upon determining that the content in the first window is not relevant to the content in the one or more other open windows, wherein:
   the one or more other open windows represent a parent window of the first window; and
   determining that the content in the first window is not relevant to the content in the one or more other open windows includes detecting a change in content of the parent window after the first window is opened.

4. The method of claim 3 wherein detecting the change in the content of the parent window comprises detecting a change in at least a portion of a network address associated with the content in the parent window.

5. A method comprising:
detecting a browser command to open a new window in addition to at least one existing window on a screen;
comparing a certain portion of a network address associated with new content to be displayed in the new window with a corresponding portion of a network address associated with existing content in the at least one existing window; and
canceling retrieval of the new content if the certain portion of the network address associated with the new content does not match the corresponding portion of the network address associated with the existing content.

6. The method of claim 5 further comprising:
determining that no new user request for content was issued between a user request for existing content and the detection of the browser command.

7. The method of claim 5 further comprising:
closing the new window after canceling retrieval of the new content.

8. The method of claim 5 wherein the certain portion of the network address contains at least a second-level domain name.

9. The method as in claim 5 wherein the at least one existing window is a parent window of the new window.

10. The method of claim 5 further comprising:
detecting a browser command to retrieve new content to be displayed in the new window, the browser command including an initial network address associated with the new content; and
intercepting a content server response containing a modified network address associated with the new content.

11. The method of claim 10 further comprising:
comparing a certain portion of the modified network address associated with the new content with a corresponding portion of the network address associated with the existing content; and
canceling retrieval of the new content if the certain portion of the modified network address associated with the new content does not match the corresponding portion of the network address associated with the existing content.

12. The method of claim 11 wherein the content server response is an HTTP response containing a redirection status code.

13. The method of claim 12 wherein canceling retrieval of the new content comprises:
modifying the intercepted HTTP response before the intercepted HTTP response reaches a browser.

14. The method of claim 13 wherein modifying the intercepted HTTP response comprises replacing the modified network address with an address of a document stored on a user computer.

15. The method of claim 11 further comprising:
closing the new window after canceling retrieval of the new content.

16. An apparatus comprising:
a popup detector to detect a first window on a screen; and
a window analyzer to test content in the first window for relevancy to content in one or more other open windows on the screen, and to trigger closing of the first window upon determining that the content in the first window is not relevant to the content in the one or more other open windows,
wherein the window analyzer determines that the content in the first window is not relevant to the content in the one or more other open windows by detecting a difference between a predefined portion of a network address associated with the content in the first window and a corresponding portion of a network address associated with the content in the one or more other open windows.

17. The apparatus of claim 16 wherein the predefined portion of the network address contains at least a second-level domain name.

18. An apparatus comprising:
a popup detector to detect a browser command to open a new window in addition to at least one existing window on a screen; and
a window analyzer to compare a certain portion of a network address associated with new content to be displayed in the new window with a corresponding portion of a network address associated with existing content in the at least one existing window, and to canceling retrieval of the new content if the certain portion of the network address associated with the new content does not match the corresponding portion of the network address associated with the existing content.

19. The apparatus of claim 18 wherein the popup detector is further to close the new window if the retrieval of the new content is cancelled.

20. The apparatus of claim 18 wherein the certain portion of the network address contains at least a second-level domain name.

21. The apparatus of claim 18 wherein the at least one existing window is a parent window of the new window.

* * * * *